United States Patent [19]

Krambeck

[11] 3,739,240

[45] June 12, 1973

[54] BURIED CHANNEL CHARGE COUPLED DEVICES

[75] Inventor: Robert Harold Krambeck, South Plainfield, N.J.

[73] Assignee: Bell Telephone Laboratories, Incorporated, Murray Hill, Berkeley Heights, N.J.

[22] Filed: Apr. 6, 1971

[21] Appl. No.: 131,721

[52] U.S. Cl...... 317/235 R, 317/235 G, 317/235 U, 307/221 C, 307/304

[51] Int. Cl. ............................................ H01l 11/14

[58] Field of Search.................... 317/235 A, 225 B, 317/235 D, 235 G, 235 NA, 235 U; 307/221, 299, 304

[56] References Cited

UNITED STATES PATENTS

| | | | |
|---|---|---|---|
| 2,856,544 | 10/1958 | Ross | 317/235 |
| 3,524,998 | 8/1970 | Gilbert | 317/235 |

*Primary Examiner*—Jerry D. Craig

*Attorney*—Arthur J. Torsiglieri and W. L. Keefauver

[57] ABSTRACT

The specification describes charge coupled devices in which the storage layer is internally charged so that the energy level profile across the thickness of the layer has a maxima in the middle of the layer. Injected carriers can then be stored and transferred in the bulk region of the semiconductor. If the energy level of the maxima exceeds the surface energy of the valence band by an amount exceeding the Boltzmann expression for thermal excitation, then the stored carriers remain isolated (statistically) from the surface states. The storage layer can be appropriately charged by biasing the layer to remove the mobile carriers. Residual fixed charge bends the energy band if the boundaries are fixed to appropriate barriers. The most convenient structure appears to be a large area p-n junction for the lower (buried) barrier with the usual MIS surface barrier. An MISIM structure is predictably similar. Multichannel structures are proposed such as N-P-N-P-N in which the isolated P-channels serve simultaneously as storage layers. Simultaneous use of both channels with controlled interconnection suggests many potential applications for logic circuits and the availability of convenient cross-overs.

10 Claims, 10 Drawing Figures

INVENTOR
R. H. KRAMBECK
BY
[signature]
ATTORNEY

BURIED CHANNEL CHARGE COUPLED DEVICES

This invention relates to charge coupled devices and in particular to a modified charge transfer mechanism which give efficient, high-speed charge transfer.

The charge coupled device concept is now well known in the art having originated from application Ser. No. 11,541, filed Feb. 16, 1970 now U.S. Pat. No. 3,700,932. It is also described from various aspects in applications, Ser. No. 47,205, filed June 18, 1970 by D. Kahng; Ser. No. 11,446,filed Feb. 16, 1970 by E. I. Gordon; Ser. No. 49,462, filed June 24, 1970 now U.S. Pat. No. 3,654,499 by G. E. Smith; Ser. No. 98,619, filed Dec. 16, 1970 by W. S. Boyle and G. E. Smith; and others.

One impediment to high charge transfer efficiency in charge coupled devices is the inscrutable presence of surface states at the semiconductor-insulator interface. Charge representing information is stored and transferred at this interface and the surface states cause trapping of charge so that after a finite number of transfer operations (which may be undesirably low) the information must be regenerated or the line terminated. Intense efforts have been devoted to overcoming this problem.

It has also been known since the earliest proposals of these devices that the charge transfer speed in a device with standard configuration is diffusion limited. Methods for enhancing the transfer rate by using drift fields were described in the original application and although the field profiles proposed then are obtainable and are significant in terms of achieving accelerated transfer, the specific mode of producing the field patterns via thick insulating layers is not always desirable. In this case again the storage and transfer of charge is at the semiconductor-insulator interface.

In fabricating charge coupled lines, it has generally been found necessary to space adjacent storage sites very closely. This avoids blocking of charge transfer due to the potential barrier that often occurs in the conventional structure when the interelectrode space is too large. It has been found that efficient, high-density, charge coupled lines often require electrode patterns that push the state of the microcircuit art in terms of the resolution tolerances allowed by current commercial processing. While advances in the printed circuit arts are expected to eventually overcome this, the development of the charge coupled device technology now appears to be dependent in part on early production capability.

According to the present invention, a new charge transfer mechanism has been discovered which overcomes at least in part these various difficulties. It relies on the storage and transfer of information charge carriers within the bulk of the storage medium rather than at its surface. Thus, the carriers encounter only bulk trapping sites, and since these are characteristically far less prevalent than surface states, the charge transfer efficiency can be increased.

Another consequence of storing carriers within the bulk is the convenience of creating field gradations for accelerating charge transfer, so that the speed of the device is limited by the drift velocity of carriers rather than the diffusion velocity. With the storage volume within the storage medium, the field profile can be tailored with relative flexibility by adjusting the electrode area and the interelectrode spacing. Achieving this with the surface storage mode may require an inordinately thick insulator.

Perhaps the most significant advantage of the bulk storage mechanism is that the electrodes are spaced at distances well within the state of the microcircuit art.

The storage and transfer of charge within the bulk of the storage medium is achieved according to the invention by providing a new storage layer to replace the semiconductor-insulator interface. This layer is a homogeneous semiconductor region having electrical charge fixed so that a potential energy minimum occurs along a storage plane located in the bulk of the layer. To allow this condition the layer is bounded by barrier layers. In an exemplary embodiment a buried p-n junction extends parallel to but spaced from the insulator-semiconductor interface. The storage medium, which is now an electrically confined layer, is then drained of free carriers. This leaves residual charge in the storage layer with a charge distribution such that new carriers, injected into the storage layer to represent information, are confined electrically to the interior region of the storage layer. Storage, transfer and processing of charge can now be achieved according to the normal charge coupled mechanism except that the charge is now maintained in the bulk of the storage medium and is electrically and spatially isolated from the surface.

The novel storage mechanism and device configurations for implementing it will now be described in detail. In the drawing.

Figure 1A:
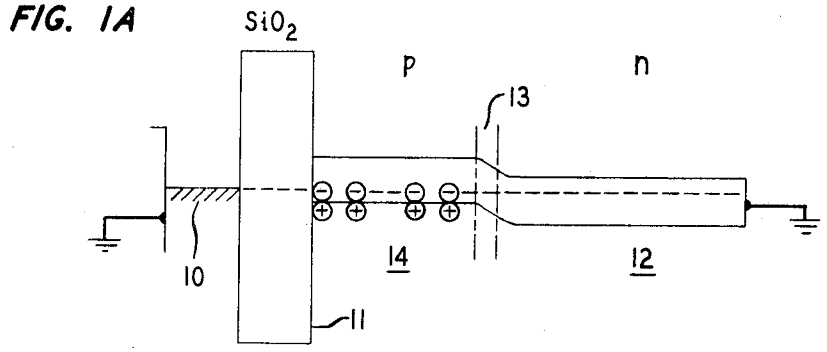
FIG. 1A is an energy level diagram of a preferred charge coupled device in an unbiased condition.

Referring to the energy level diagram of FIG. 1A the layer 10 is the conventional metal electrode used to control storage and transfer of the charge carriers. Layer 11 is the standard insulating layer. A semiconductor layer normally completes the MIS structure. In the usual charge coupled device storage and transfer of charge occurs at the semiconductor-insulator interface. As pointed out above, this heterogeneous region is not a favorable location for that operation. According to the invention, the energy minimum that normally attracts charge to the interface is shifted to a homogeneous layer that intervenes between the semiconductor and the insulator. In FIG. 1 the usual n-layer is represented at 12. The intervening storage layer appears at 14 and the barrier, in this case a p-n junction, occurs at 13. It should be evident that whenever conductivity types are indicated the complementary configuration can be used as well.

FIG. 1A shows the device in thermal equilibrium with the free positive charge in the p-layer associated with fixed negative charge as shown.

Figure 1B:
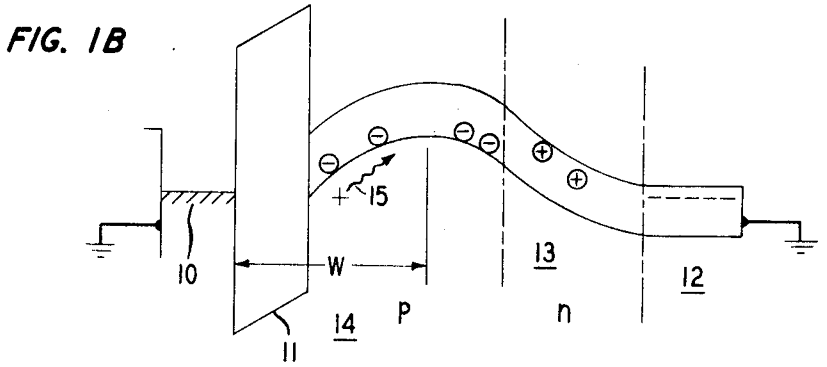
FIG. 1B is an energy level diagram of the same device after biasing to remove the free carriers.

In FIG. 1B the free charge has been removed from the p-layer by simply biasing this layer with a voltage negative with respect to the n-layer 12. With proper design as set forth below, the result is that residual negative charge bends the energy bands as shown and leaves a buried channel for positive charge in the middle of the storage layer. Thus, when free positive charge, such as hole 15, is intentionally introduced into the storage medium, it will physically drift to the allowed state of minimum potential, at a distance W corresponding to the channel depth, and thus will be electrically confined to the interior of layer 14.

Figure 2:
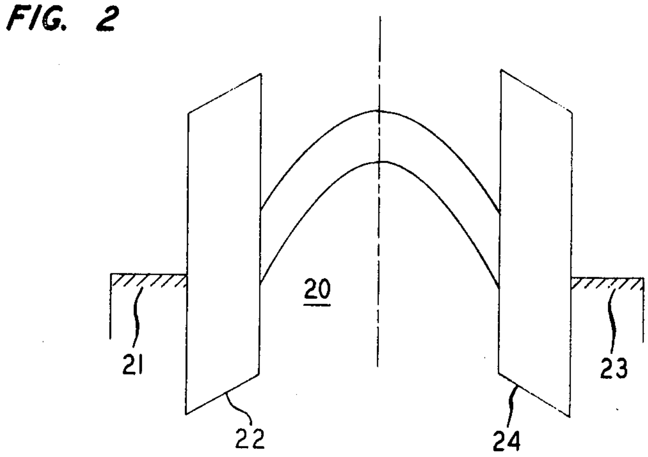
FIG. 2 is an energy level diagram of an alternate device structure in which the storage layer is terminated on each side with a metal-insulator barrier.

FIG. 2 is a similar energy level diagram intended to illustrate that other forms of barrier layers can be used in lieu of the p-n junction of FIGS. 1A and 1B. In this structure the semiconductor storage medium 20 is bounded on both planar faces with a metal-insulator barrier, 21–22 and 23–24, respectively. When the storage layer 20 is depleted of carriers the band structure in the storage medium 20 is qualitatively equivalent to that of layer 14 in FIG. 1A.

Figure 3:
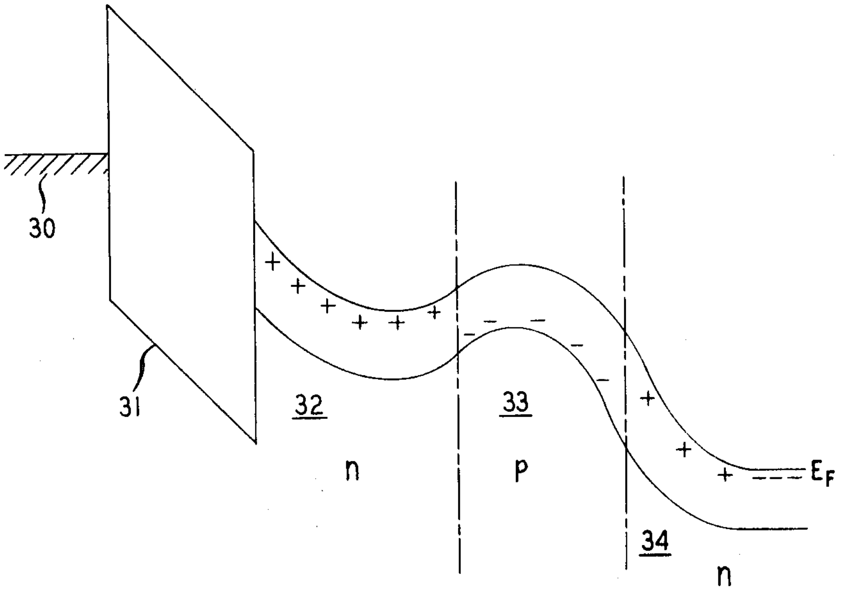
FIG. 3 is an energy level diagram of another alternative structure with a buried channel for the storage of charge.

FIG. 3 is an energy level diagram showing another alternative in which the storage medium is isolated on both sides with a p-n junction. Again the basic structure is metal-insulator-semiconductor with the conventional metal layer, 30, and insulator layer 31. The semiconductor, however, is an n-p-n structure comprising n-layer 32, p-layer 33 (the storage layer) and n-layer 34. The band structure of layer 33, after depletion of free carriers, resembles that in the previous structures.

It should be apparent that the n-p-n structure of FIG. 3 can be extended to provide dual channel operation on both sides of a single device by providing parallel buried channels through dual layer isolation. For example, using an n-p-n-p-n structure, two parallel p-channels are isolated. Interconnection between channels can be performed through obvious implementation.

Figure 4:
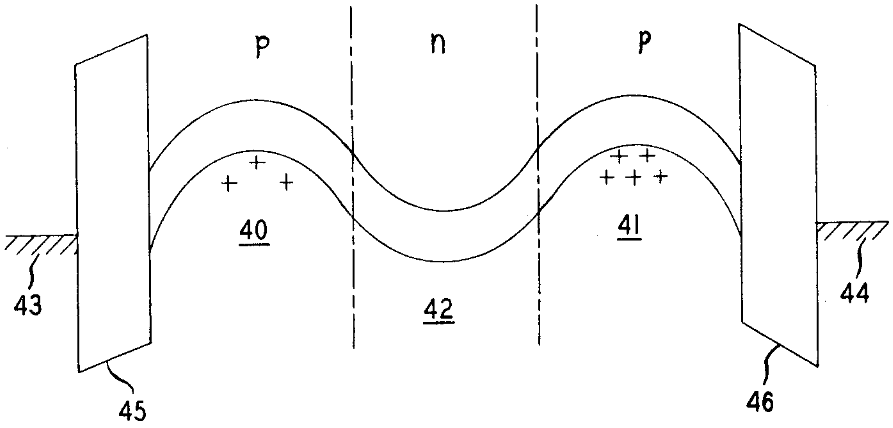
FIG. 4 is an energy level diagram illustrating a composite structure for creating buried channels on both sides of a device.

Another structure that provides a similar multichannel device is represented by the energy level diagram of FIG. 4. This device isolates two parallel channels using simply an n-p-n structure. The two p-type storage layers 40 and 41 are isolated in the interior region by n-layer 42. The other boundaries are MIS barriers formed by metal layers 43, 44 and insulating layers 45, 46. The curved band structure of the storage layers, which at this point will be recognized as a basis for the invention, is evident. It will also be appreciated that, inherent in the dual plane channel structures just described is the potential for constructing electrical crossovers and interconnections and for obtaining structures resembling functionally, those described in U. S. Pat. application, Ser. No. 98,619, filed Dec. 16, 1970 by W. S. Boyle and G. E. Smith.

Figure 5:
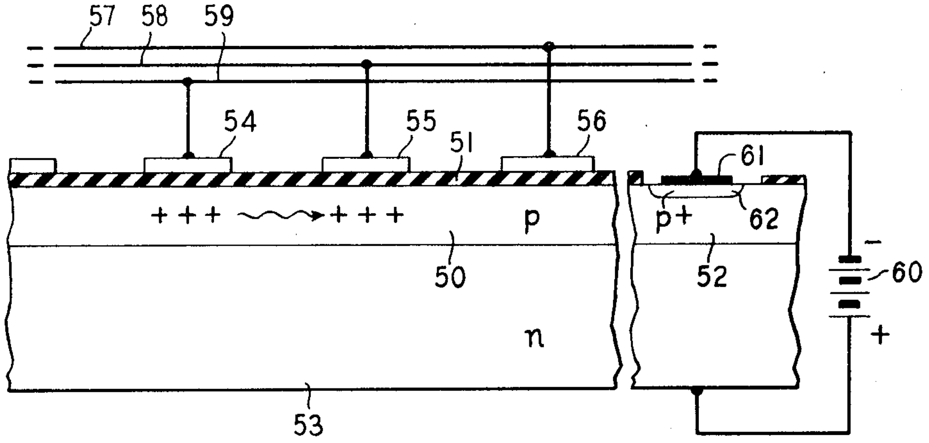
FIG. 5 is a sectional view of a preferred form of single channel device having the electrical configuration represented by FIGS. 1A and 1B.

As exemplary device configuration is shown in FIG. 5. The storage layer 50, which here is shown as p-type semiconductor, and in a preferred embodiment is silicon with a normal resistivity (0.1 to 100 ohm cm), is bounded on the surface with the usual insulating layer 51 and is further isolated at its lower boundary by p-n junction 52 formed in the conventional way and including n-layer 53. The device shown has control electrodes 54, 55 and 56 connected to a conventional three wire drive comprising wires 57, 58 and 59 (illustrated schematically). Bias means 60 is shown schematically and is intended to bias, via electrode 61, the storage layer 50 with respect to n-layer 53 so that the carriers in the storage layer are essentially removed. Electrode 61 in combination with a $p^+$ region 62 is provided to allow ohmic contact. The device is then in condition for normal charge coupled operation except that the information carriers will now be stored and transferred in the bulk of the storage layer as indicated schematically in the figure.

Figure 6:
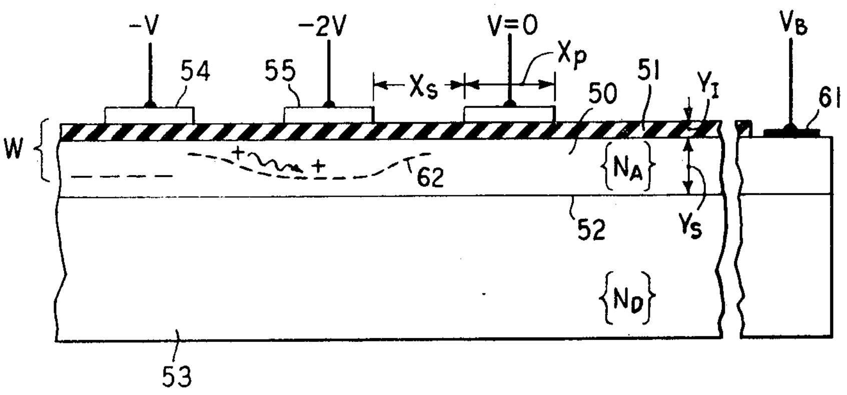
FIG. 6 is a sectional view describing schematically the field enhancement mechanism obtainable according to the invention.

Field enhancement of the charge transfer process is illustrated in FIG. 6. The storage medium 50 is structurally the same as that in FIG. 5. With a voltage V impressed on electrode 54 and a larger voltage, e.g., 2V, impressed on electrode 55, the field profile will approximate that suggested schematically by the dashed line 62. Since the carriers are now located within the bulk of the storage layer, they can be influenced by the field gradient. In the normal charge transfer process the carriers are located so near to the interface between layers 50 and 51 that an effective field gradient may require an inordinately thick insulating layer or inordinately small electrodes and spacing.

It is also evident from FIGS. 5 and 6 that the electrode spacing appears larger than is encountered with an ordinary charge coupled device. Indeed this can be the case due to the unique storage mechanism of the invention. It is this feature that leads to the potential processing advantages alluded to previously.

However, just as in the former devices, large interelectrode spacing leads to "blocking" of charge, this time due to large potential wells that form between the electrodes. Although it is not immediately evident from the foregoing description, experiments have shown that charge injected into a storage layer of the kind described in connection with FIG. 5 does not distribute uniformly due to the presence of the metal field plates. The regions between the field plates have lower potential energies and attract charge. Therefore it is helpful to incorporate fixed charge into the structure to overcome this. In the configuration described in connection with FIGS. 5 and 6 the regions between the field plates attract positive charge. This can be compensated by introducing fixed positive charge in or near those regions. A convenient way for accomplishing this is to implant positive ions into the insulating layer and/or the semiconductor between the electrodes using the latter as a mask. The mechanics of doing this are well known. The amount of charge should be sufficient to establish approximately a uniform electric field along the semiconductor surface when a bias equivalent to the storage bias is applied to the field plates. This can be calculated in a simple model using the relation.

$$P = \epsilon E$$

where $P$ is the necessary polarization in coulombs/cm$^2$. $\epsilon$ is the dielectric constant of the insulator and $E$ is the electric field. In this case E should approximate the electric field under the field plate, or V/$d$ where V is the storage voltage on the field plate and $d$ is the thickness of the insulator under the field plate.

Figure 7:
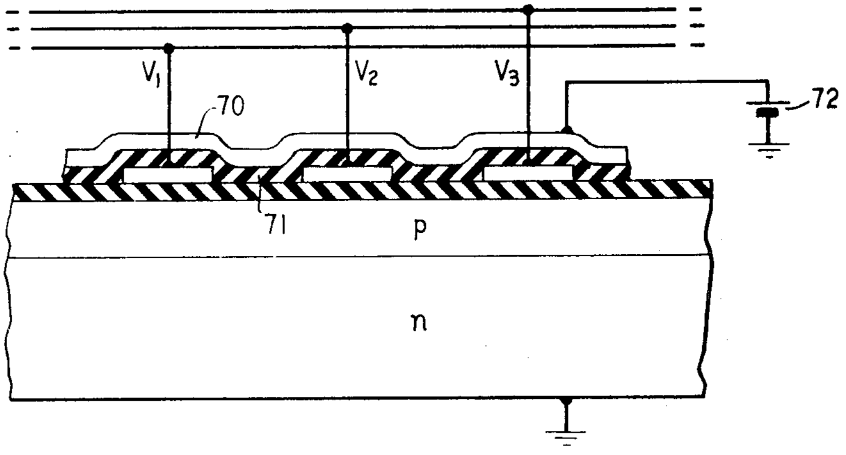
FIG. 7 is a sectional view of a device similar to that of FIG. 5 but with provision for compensating for charge trapping at the large potential wells that inherently form between the field plates.

Another way of compensating for these large inter-electrode potential wells is shown in FIG. 7. This section is a portion of the device of FIG. 5 and is similar in detail except for the provision of a continuous field plate 70 extending along the entire active surface. The field plate 70 is insulated from the drive electrodes by insulating layer 71. Since the metal plate 70 is nearer to the semiconductor in the regions between the electrodes a positive voltage placed on the electrode 70 via voltage source 72 will be equivalent to placing fixed positive charge at the semiconductor-insulator interface as just described. Appropriate voltages and insulating layer thicknesses can be obtained from the expressions discussed above.

A preferred method for overcoming the deep inter-electrode wells is to use a four-layer metallization as described in detail in U. S. Pat. application Ser. No. 85,026, filed Oct. 29, 1970 by G. E. Smith and R. J. Strain.

Finally it should be pointed out that the p-n-p structures or, in general, forms in which the storage layer is isolated with a p-n junction on both sides, do not suffer from this problem.

Referring again to FIG. 6, experiments have shown that for effective field aided transfer, the average electrode dimension $X_p$, is preferably related to the dimension W by the following:

$$1/100 < W/x_p < 10 .$$

It is evident that the dimension W includes the thickness of the insulating layer. This layer should be thick enough to avoid dielectric breakdown but yet sufficiently thin to allow for practical drive voltages on the control elements. For silicon dioxide on silicon a desirable range is 0.02 to 1 micron. More specifically, if the $SiO_2$ is 0.1 micron thick and the carrier concentration in a storage layer 5$\mu$ thick is of the order of $10^{15}$/cm$^{-3}$ then appropriate drive voltages fall inthe useful range of 0–50 volts, e.g., 0, 5 and 10 volts on the three-wire drive system.

Appropriate impurity concentrations can be prescribed in terms of the thickness of the storage layer as follows:

To avoid breakdown, the doping density, $N_a$ in cm$^{-3}$, in the storage layer is given by the approximate expression.

$$N_A \leq (6.6\times10^{19} (E_g/1.1)^{3/2}K_s/W^2)^{4/7}$$

where $E_g$ is the band gap in $e$V, $K_s$ the dielectric constant and $W$ the depth of the channel. For silicon $$N_A \leq (8\times10^{20}/W^2)^{4/7}.$$

If a channel depth of $10^{-3}$ cm is assumed by way of example then the maximum carrier concentration $N_A$ is $2.5\times10^{15}$/cm$^{-3}$. The lower limit is ordinarily established by the intrinsic carrier concentration.

From the standpoint of maintaining the charge that represents the information isolated from the surface states it would normally be sufficient if the storage medium is such that the energy difference between the stored carriers in the bulk and the surface states is too large to be overcome by thermal excitation. The specific energy difference is simply the Boltzmann expression kT. In a structural sense this means that carriers stored in silicon via the inventive mechanism will ordinarily reside physically at a depth of at least 30A. from the silicon-insulator interface. In typical structures this distance is generally of the order of 0.01 to 10 microns.

Figure 8:
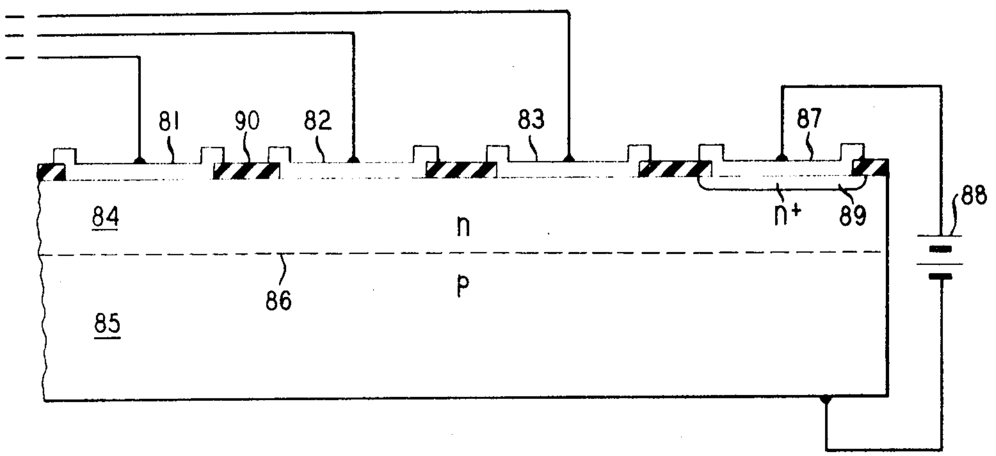
FIG. 8 is a schematic sectional view of an alternative embodiment in which the storage layer is isolated from the drive electrodes with Schottky barriers; and, FIG. 9 is a schematic sectional view of another alternative embodiment in which the storage layer is isolated from the drive electrodes with p-n junctions.
Figure 9:
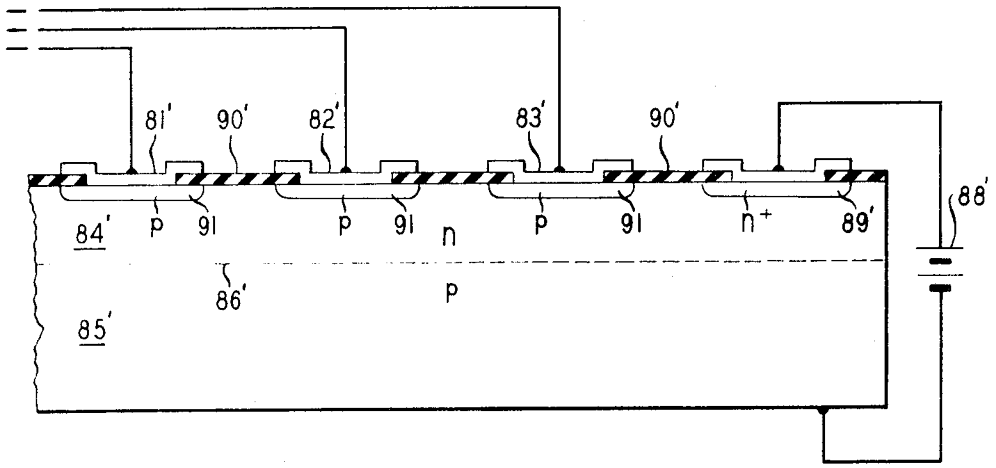

With reference to the symbols appearing in FIG. 6 the following specific values are given by way of example:

$X_s = 1 \times 10^{-3}$ cm
$X_p = 1 \times 10^{-3}$ cm
$Y_i = 1 \times 10^{-5}$ cm
$Y_s = 5.0 \times 10^{-4}$ cm
$N_A = 2 \times 10^{15}$ cm$^{-3}$
$N_D = 10^{14}$ cm$^{-3}$
$V = 5$ volts
$V_B = 20$ volts
$W \approx 4 \times 10^{-4}$ cm Two additional structures in which the buried channel is isolated from the drive electrodes by individual barriers at each electrode are shown in FIGS. 8 and 9, respectively. These structures take advantage of the recognition that when a Schottky barrier or p-n junction is used for isolating the channel from the electrode, the usual intervening insulating layer, e.g., layer 31 in FIG. 3, is not essential from a functional standpoint. Thus, in FIG. 8, metal electrodes 81–83 can be placed directly on the semiconductor storage layer 84. The storage layer is isolated on the buried side by substrate 85 forming p-n junction 86. The electrodes form nonohmic contacts so that the electrode 87, used to bias the storage layer via source 88, requires a more highly doped region 89 similar to region 62 in FIG. 6. The exemplary three-phase drive is shown as before. The metal electrodes 81 to 83 may comprise any of several metals forming Schottky barriers with the substrate. In the case of silicon, appropriate metals are Cu, Mo, No, W, any of the six platinum group metals, or mixtures thereof. Formation of these barriers is described in BSTJ, Vol. XLIV, No. 7, Sept. 1965. The thickness of the electrodes is not critical. As a consequence of normal fabrication techniques, the metal electrodes are formed within windows of an insulating layer 90.

The other embodiment, in which isolation is achieved via p-n junctions, is shown in FIG. 9. The configuration is essentially identical to that of FIG. 8 with prime numbers corresponding to the respective elements in FIG. 8 except for the diffused p-regions 91 underlying each drive electrode. The p-regions can be formed by diffusion through the windows of the oxide prior to formation of the metal, by diffusion from doped metal contacts, or by implantation either prior to formation of the electrodes or implantation through the electrodes if the relative ion transparency of the electrodes with respect to the insulating layer is favorable.

The embodiment of FIG. 9, having p-n junction isolation rather than MOS or Schottky barriers, has the advantage that thermal generation currents are low.

Another modification will be noted in FIGS. 8 and 9 and that is that the n- and p- layers are complementary to those of FIGS. 1–7. Possible doping parameters for this configuration are the following:

$$N_A = 10^{14}/\text{cm}^3,$$

$$N_D = 10^{16}/\text{cm}^3,$$

depth of n-layer = $10^{-4}$cm.

It is preferred that the doping density of the substrate be less than that of the n-layer.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A charge coupled device comprising:

a planar charge storage medium;

a multiplicity of discrete electrode field plates arranged adjacent to the charge storage medium, each capable when electrically biased of forming an associated charge storage site within the charge storage medium, the field plates being spaced sequentially in a direction parallel to the plane of the charge storage medium with each adjacent to at least two other field plates so that, with appropriate electrical bias applied to at least two of said field plates, electrical charge can be made to pass controllably between selected charge storage sites and ultimately to a detection site;

input means for introducing mobile electrical charge into the charge storage medium;

detection means for detecting the presence or absence of charge in the storage medium at a detection site;

charge transfer means including said field plates for transferring within the storage medium, the electrical charge between storage sites, and to the detection site;

the invention characterized in that the storage medium is bounded on all sides with electrical barriers except for a limited area ohmic contact adapted for electrically biasing the storage medium to deplete the storage medium and, with the electrical bias applied to the field plates, to create potential minima for the stored electrical charge, the potential minima existing physically within the storage medium interior of the boundary electrical barriers whereby said charge storage sites exist physically within said interior, and further characterized in that the electrode field plates are disposed directly on the planar surface of the storage medium forming Schottky barriers therewith.

2. The charge coupled device of claim 1 in which the planar storage medium is a p-type semiconductor and the input means is adapted for introducing mobile positive charge into the charge storage medium.

3. The charge coupled device of claim 1 in which the planar storage medium is an n-type semiconductor and the input means is adapted for introducing mobile negative charge into the charge storage medium.

4. The device of claim 1 further including an insulating layer covering the spaced portions of the storage medium between the field plates.

5. The device of claim 1 in which the charge storage medium is silicon.

6. The device of claim 5 in which the field plates comprise a metal selected from the group consisting of Cu, Mo, W, No, the six-platinum group metals and mixtures thereof and the Schottky barrier comprises a metal silicide-silicon interface.

7. A charge coupled device comprising:

a planar charge storage medium;

a multiplicity of discrete electrode field plates arranged adjacent to the charge storage medium, each capable when electrically biased of forming an associated charge storage site within the charge storage medium, the field plates being spaced sequentially in a direction parallel to the plane of the charge storage medium with each adjacent to at least two other field plates so that, with appropriate electrical bias applied to at least two of said field plates, electrical charge can be made to pass controllably between selected charge storage sites and ultimately to a detection site;

input means for introducing mobile electrical charge into the charge storage medium;

detection means for detecting the presence or absence of charge in the storage medium at a detection site;

charge transfer means including said field plates for transferring within the storage medium, the electrical charge between storage sites, and to the detection site;

the invention characterized in that the storage medium is a semiconductor bounded on all sides with electrical barriers except for a limited area ohmic contact adapted for electrically biasing the storage medium to deplete the storage medium and, with the electrical bias applied to the field plates, to create potential minima for the stored electrical charge, the potential minima existing physically within the storage medium interior of the boundary electrical barriers whereby said charge storage sites exist physically within said interior, and further characterized in that each electrode field plate is disposed on a separate impurity region formed into the planar surface of the storage medium so as to form therewith a p-n junction electrical barrier.

8. The charge coupled device of claim 7 in which the planar storage medium is a p-type semiconductor and the input means is adapted for introducing mobile positive charge into the charge storage medium.

9. The charge coupled device of claim 7 in which the planar storage medium is an n-type semiconductor and the input means is adapted for introducing mobile negative charge into the charge storage medium.

10. The device of claim 7 in which the charge storage medium is silicon.

* * * * *

UNITED STATES PATENT OFFICE

CERTIFICATE OF CORRECTION

Patent No. 3,739,240 Dated June 12, 1973

Inventor(s) Robert H. Krambeck

It is certified that error appears in the above-identified patent and that said Letters Patent are hereby corrected as shown below:

Col. 1, line 8, delete --now U. S. Pat. No.--;
line 9, delete --3,700,932--;
line 10, after "June 18, 1970", add --now U. S. Pat. No. 3,710,932--.

Col. 4, line 1, delete "As" and substitute therefor --An--.

Col. 5, line 40, after "$SiO_2$" add --layer--.

Signed and sealed this 18th day of December 1973.

(SEAL)
Attest:

EDWARD M.FLETCHER,JR.
Attesting Officer

RENE D. TEGTMEYER
Acting Commissioner of Patents